(12) United States Patent
Wang et al.

(10) Patent No.: US 6,504,849 B1
(45) Date of Patent: *Jan. 7, 2003

(54) FIBER AUTO-NEGOTIATION

(75) Inventors: Yun-Che Wang, Los Altos, CA (US); Chuan-Ding Arthur Hsu, San Jose, CA (US); Venkataraman Sukavanam, San Jose, CA (US)

(73) Assignee: Cypress Semiconductor Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,921

(22) Filed: Sep. 22, 1997

Related U.S. Application Data

(60) Provisional application No. 60/046,519, filed on May 15, 1997.

(51) Int. Cl.[7] .............................................. H04L 12/413
(52) U.S. Cl. ........................................ 370/455; 370/477
(58) Field of Search ................................ 370/445, 465, 370/446, 466, 276, 280, 294, 296, 401, 462, 447, 438; 375/293, 220, 359, 442; 341/70

(56) References Cited

U.S. PATENT DOCUMENTS

| | | | | | |
|---|---|---|---|---|---|
| 4,953,210 A | * | 8/1990 | McGlynn et al. | .............. | 380/48 |
| 5,550,864 A | * | 8/1996 | Toy et al. | .................... | 375/293 |
| 5,586,117 A | * | 12/1996 | Edem et al. | ................. | 370/466 |
| 5,673,254 A | * | 9/1997 | Crayford | ................. | 370/446 X |
| 5,737,108 A | * | 4/1998 | Bunch et al. | ................ | 359/152 |
| 5,907,553 A | * | 5/1999 | Kelly et al. | ................ | 370/465 X |
| 5,953,340 A | * | 9/1999 | Scott et al. | .............. | 370/465 X |
| 5,991,303 A | * | 11/1999 | Mills | ...................... | 370/445 X |
| 6,215,816 B1 | * | 4/2001 | Gillespie et al. | ........... | 3759/220 |

* cited by examiner

*Primary Examiner*—Steven Nguyen
*Assistant Examiner*—Phuongchau Ba Nguyen

(57) ABSTRACT

A communication node is configured to automatically select an optimum common operational mode between itself and a link partner. The communication node sends advertisement packets across a fiber optic medium in order to broadcast its operational capabilities to the link partner. These operational capabilities may include 10BASE-FL and 100BASE-FL. Transitions may be inserted between the advertisement packets which may include clock pulses, data pulses and transitions. The communication node may be attached to a network having a bus architecture and may further be configured to identify an idle signal.

16 Claims, 19 Drawing Sheets

| S0 | S1 | S2 | S3 | S4 | A0 | A1 | A2 | A3 | A4 | A5 | A6 | A7 | RF | ACK | NP |
|----|----|----|----|----|----|----|----|----|----|----|----|----|----|----|----|

300

S0 - S4: Sector Field (IEEE 802.3)
A0 - A7: Technology Abilities:
    A0: 10BASE - T
    A1: 10BASE -T FULL DUPLEX
    A2: 100BASE - TX
    A3: 100BASE - TX FULL DUPLEX
    A4: 100BASE - T4
    A5,A6,A7: Reserved for Future Use FIGURE 3
(Conventional Art)

FLP BURST - to - FLP BURST TIMING

FLP BURST PULSE - to - PULSE TIMING

DATA BIT ENCODING WITHIN FLP BURSTS

TABLE 1: FLP BURST TIMING SUMMARY

| # | PARAMETER | MIN. | TYP. | MAX. | UNITS |
|---|---|---|---|---|---|
| T1 | CLOCK/DATA PULSE WIDTH | | 100 | | nsec. |
| T2 | CLOCK PULSE - to - CLOCK PULSE | 111 | 125 | 139 | μsec. |
| T3 | CLOCK PULSE - to - DATA PULSE (DATA = 1) | 55.5 | 62.5 | 69.5 | μsec. |
| T4 | PULSES IN A BURST | 17 | | 33 | # |
| T5 | BURST WIDTH | | 2 | | msec. |
| T6 | FLP BURST - to - FLP BURST | 8 | 16 | 24 | msec. |

FIGURE 4D
(Conventional Art)

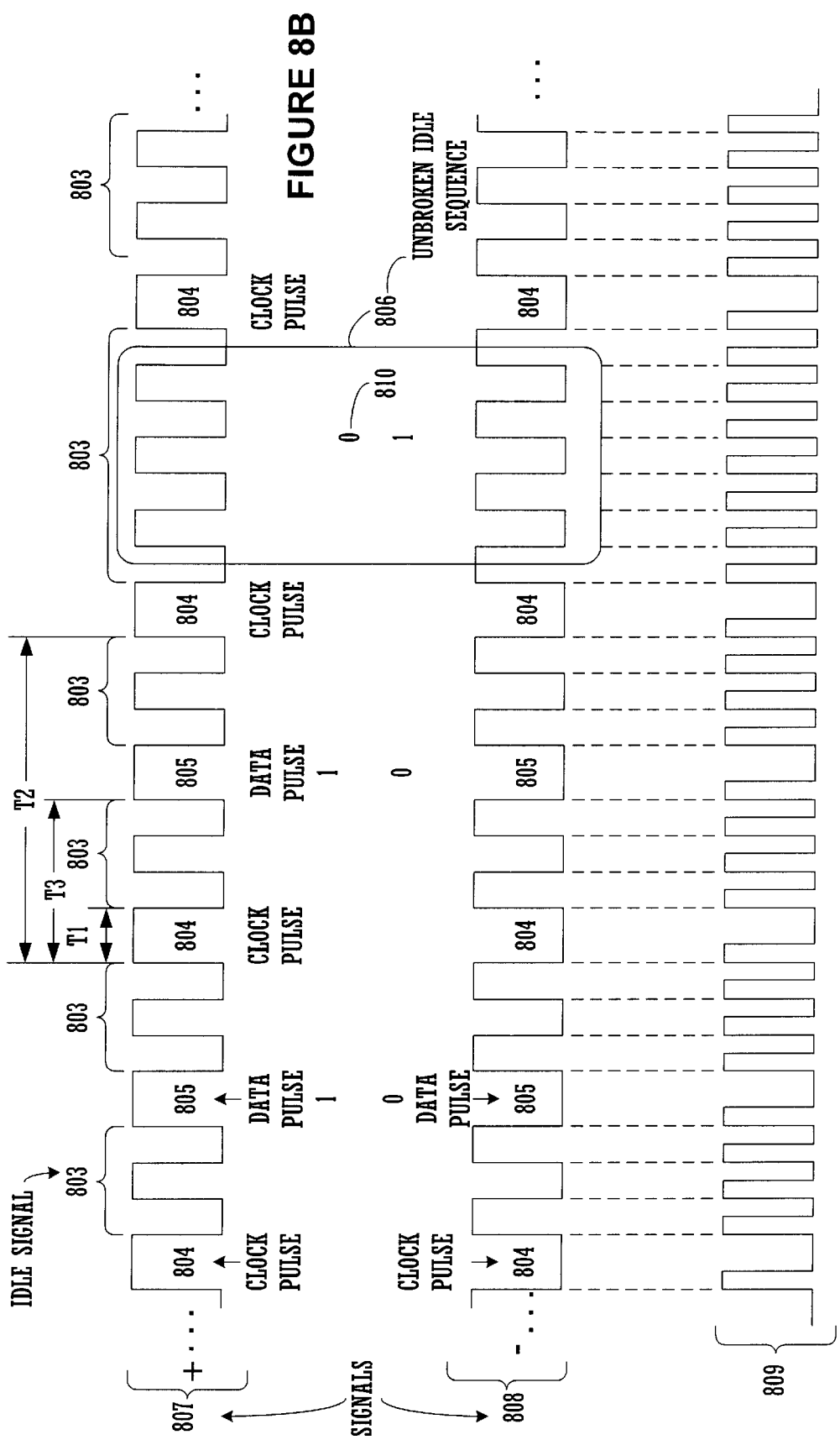

TABLE 2

| # | PARAMETER | MIN. | TYP. | MAX. | UNITS |
|---|---|---|---|---|---|
| T1 | CLOCK/DATA PULSE WIDTH | 2.5 | 3 | 3.5 | μsec. |
| T2 | CLOCK PULSE - to - CLOCK PULSE | 111 | 125 | 139 | μsec. |
| T3 | CLOCK PULSE - to - DATA PULSE (DATA = 1) | 55.5 | 62.5 | 69.5 | μsec. |
| T4 | PULSES IN A BURST | 17 | | 33 | # |
| T5 | BURST WIDTH | | 2 | | msec. |
| T6 | FLP BURST - to - FLP BURST | 8 | 16 | 24 | msec. |

FIGURE 8D

BASE PAGE LINK CODE WORD

| S0 | S1 | S2 | S3 | S4 | A0 | A1 | A2 | A3 | A4 | A5 | A6 | A7 | RF | ACK | NP |
|----|----|----|----|----|----|----|----|----|----|----|----|----|----|-----|-----|

S0 - S4: Selector Field (IEEE 802.3)
A0 - A7: Technology Abilities:
    A0: 10BASE - FL
    A1: 10BASE -FL FULL DUPLEX
    A2: 100BASE - FX
    A3: 100BASE - FX FULL DUPLEX
    A4: No 100BASE - T4
    A5,A6,A7: Reserved for Future Use RF: Remote Fault = 0
ACK: Acknowledge = 0
NP: Next Page = 1

FIGURE 8E

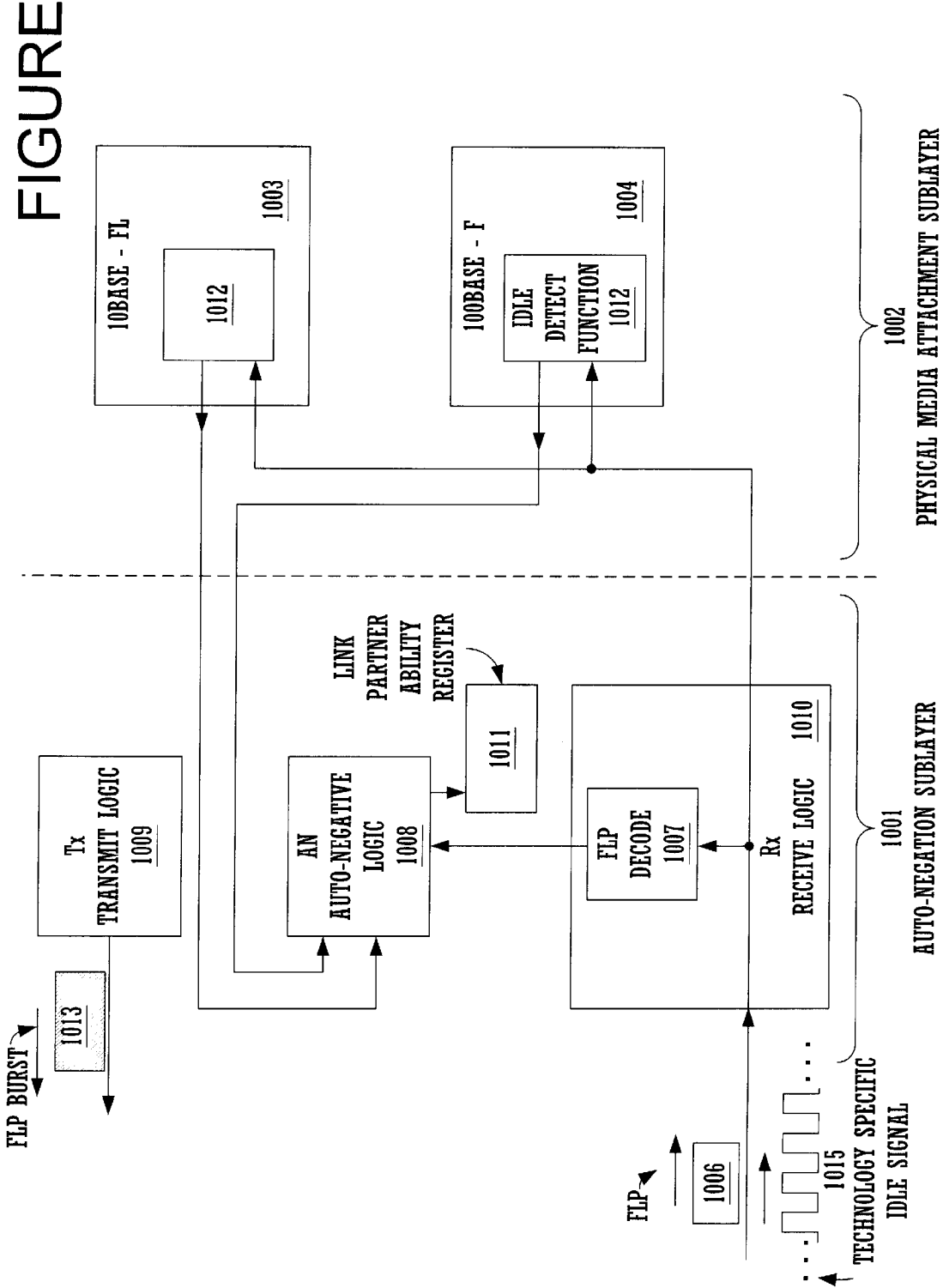

US 6,504,849 B1

FIBER AUTO-NEGOTIATION

RELATED APPLICATIONS

This application is related to and hereby claims the priority benefit of an earlier-filed Provisional Application No. 60/046,519, entitled "Fiber Auto-Negotiation" and filed May 15, 1997.

FIELD OF THE INVENTION

The present invention relates to the field of networking, and more specifically, to the automatic configuration of a fiber optic link that couples two communication nodes.

BACKGROUND

Computer networks enable different systems to communicate with one another. Desirable figures of merit for computer networks include: 1) high bandwidth, 2) low costs associated with bringing up and maintaining a network and 3) backward compatibility of new equipment that is added to an existing network. Existing computer networks are constantly evolving. As the performance of systems that attach to and communicate over a computer network increase, there must be a corresponding improvement in the performance (e.g., bandwidth) of the network. Networks must not only improve in their performance, but also must improve in their ease of management. As network configurations become more complex, network administrators continue to require less and less time spent for each addition, removal, replacement and/or upgrade of their networking hardware or software. Furthermore, new hardware or software must be able to co-exist with the existing hardware and software. This maximizes the return on investment in the older equipment and software. As a result, network administrators place high demand on those new products that increase network performance and ease system management without making their existing hardware and software obsolete. Auto-Negotiation is a network function that enhances network bandwidth, reduces network maintenance costs and accounts for the desire of backward compatible equipment.

Auto-Negotiation is an additional layer within the physical layer of a network communication node. Auto-Negotiation for twisted-pair (copper wire) based Ethernet ("BASE-T") has been defined in a standard promulgated by the Institute of Electrical and Electronic Engineers (IEEE), entitled "Physical Layer Link Signaling for 10 Mb/s & 100 Mb/s Auto-Negotiation on Twisted-Pair" and referred to as IEEE Standard 802.3u, cl. 28. Briefly, Auto-Negotiation allows a network administrator to add a communication node to a network without having to configure the communication node as to the speed or complexity of the link that connects the node to the network. That is, the communication node itself has the intelligence to optimize itself to the network. Thus, the optimization process, referred to as "negotiation", is automatic. BASE-T Auto-Negotiation was developed to work within a star (as opposed to ring) topology.

Refer to FIG. 1a. Bus architectures such as BASE-T (as well as ring architectures), were originally designed and developed as shared media networks. That is, for a bus architecture 100 all communication nodes 101 were attached to the same transmission media (e.g., a copper wire bus) 102, or at least were electrically shorted to one another.

As network configurations evolved, the shared medium 102 was replaced by repeaters or hubs 103 shown in FIG. 1b. Within each repeater/hub 103 is a virtual shared media bus 108. Thus a "bus" medium may be either actually shared or virtually shared. Virtual shared media bus 108 is not an actual shared media. That is, there are various transceivers 109 on each port 107a–107d such that the links 104a–104d are no longer short circuited to one another.

Hubs are designed to intelligently manipulate and analyze packets that are received from and transmitted to systems 101a–101d on each link 104a–104d, while repeaters 103 simply resend the digital data received on one port 107a–107d to all other ports 107a–107d. The ensuing discussion refers to systems 101a–101d and hubs or repeaters 103. It must be understood that both systems 101a–101d and hubs/repeaters 103 are communication nodes. A communication node is any machine or device attached to a link. Usually there are two communication nodes per link. A link is usually a copper-based cable or a fiber optic cable.

Most local area networks (LANs) are currently implemented such that each system link 104a–104d is wired to a patch panel 105 within a wiring closet 106. The repeater or intelligent hub 103 is mounted within the wiring closet 106 and its ports 107a–107d are wired to the patch panel 105 such that each repeater/hub port 107a–107d has a direct link 104a–104d to each system 101a–101d. Over time, systems 101a–101d and repeaters/hubs 103 may be replaced by higher performance units (in order to meet the networking requirements of the improved systems). For the most part, system 101a–101d and repeater/hub 103 upgrades have been possible without replacing the installed cables 104a–104d. Thus the layout of FIG. 1b has allowed for relatively easy equipment upgrades while presenting the investment made in the installed cables.

In this sense, the emergence of repeaters/intelligent hubs 103 has resulted in the evolution of LANS away from their original actual shared media design point. Auto-Negotiation was originally designed to ease the effort associated with bringing up systems attached to a hub-based LAN. That is, Auto-Negotiation appeared sometime during or after the evolution away from actual shared media LANs. Auto-Negotiation allows a system, e.g., system 101a, and its specific hub port, e.g., port 107a, to automatically configure themselves according to their highest performing mode of operation.

As an example, when the network shown in FIG. 1b is brought up or when an older system is replaced by system 101a, system 101a will advertise its various modes of operation to the hub 103. The hub 103 will detect this advertisement, through port 107a, and respond with its own advertisement of possible modes of operation at port 107a. Together, the two systems can understand their common mode(s) of operation (as to copper wire link 104a), reject their uncommon modes and, if there is more than one common mode, resolve to a single mode of operation based upon a priority resolution function found within both the system 101a and the hub 103. The priority resolution function is designed to configure the system 101a and the hub 103 at port 107a such that they operate at their highest performing common mode on the copper wire link 104a.

The process of advertisement, acknowledgment, response, etc. is generally referred to as negotiation. Such negotiation takes place between every system 101a–101d on the network that has Auto-Negotiation capability and its associated hub port 107a–107d. As a result, the mode of operation between each system is maximized to the highest performing common mode along each of copper wire links 104a–104d. Thus, if a first system 101a has a highest common mode, A, with its associated hub port 107a, the hub 103 and systems 101a will communicate with each other under mode A. If a different system 101b has another highest common mode, B, with its associated hub port 107b, system 101b will communicate with hub 103, along copper wire link 104b, under mode B.

A "mode" of operation is generally representative of the performance of the interconnection between two communication nodes. Under IEEE std. 802.3u, cl. 28, the modes of operation are prioritized according to the maximum data rate of each link. Within identical data rates, modes are prioritized according to the number of lines utilized (i.e., the link's capacity). Thus, 100BASE-TX Full-Duplex is prioritized over 100BASE-TX Half-Duplex; 100BASE-TX Half-Duplex is prioritized over 10BASE-T Full-Duplex; and 10BASE-T Full-Duplex is prioritized over 10BASE-T Half-Duplex (see Annex 28B.3in IEEE std. 802.3u cl. 28). Under the BASE-T technologies, "100" and "10" correspond to 100 MB/s and 10 MB/s data rates, respectively. Different modes exist for a number of reasons. These include: 1) more advanced physical layer technologies continue to evolve (e.g., 10 MB/s to 100 MB/s) and 2) different markets exist for each unique mode. By always resolving to the highest common mode of operation on each link 104a–104d, the overall bandwidth of the network 100 is maximized. Thus Auto-Negotiation serves the first of the three aforementioned figures of merit: bandwidth.

The Auto-Negotiation function also reduces bring up and maintenance time. This is because the negotiation is automatic. That is, the network administrator does not have to individually configure each system 101a–101d or port 107a–107d such that it communicates at the highest possible operational mode. The Auto-Negotiation function is typically implemented in silicon (although some hardware units may be enhanced with software).

The Auto-Negotiation function is a physical layer function and therefore is expected to configure all the systems 101a–101d on the network 100 such that they communicate to the hub ports 107a–107d at their maximum common operational modes with minimal intervention by layers at or higher than the Media Independent Interface (MII) (see FIG. 28-2, IEEE std. 802.3u, cl.28).

FIG. 2 shows one example of the Auto-Negotiation function implemented in a network. Each hub link adapter card 207 is functionally equivalent to a port 107a–107d of FIG. 1b. A full duplex copper wire link 204 connects the hub adapter card 207 to the system adapter card 208. Each adapter card 207, 208 has an identical Auto-Negotiation unit 211 located one level up along the data path 210 from the media dependent interface (MDI) 209. Transceivers 214 are located on the other side of the MDI 209 than the Auto-Negotiation unit 211. Thus each link 204 has two identical Auto-Negotiation units 211, one for each adapter card 207, 208.

The aforementioned negotiation process is controlled by Auto-Negotiation units. That is, using the previous example, Auto-Negotiation unit 211 of adapter card 208 places advertisement packet 212 on the link 204. Auto-Negotiation unit 211 of adapter card 207 identifies and processes the advertisement packet 212. Auto-Negotiation unit 211 of adapter card 207 then responds with a corresponding advertisement packet 213. Auto-Negotiation unit 211 of adapter card 208 then identifies the hub advertisement packet 213. At this point both link partners (i.e., link adapter cards 207, 208) know each other's capabilities.

Next, the two Auto-Negotiation units 211 execute identical priority resolution functions. Ideally, both resolve to the same mode. Once a common mode of operation is settled upon, both Auto-Negotiation units 211 report (typically through a register) to the higher levels in their respective communication nodes the settled upon mode of operation. Each communication node is then capable of addressing the link 204 according to that mode of operation. As this process is entirely automatic, the network administrator is saved the effort of having to determine each mode of operation for each link. Ideally, the administrator is also spared the effort of configuring each adapter card and/or communication node according to the proper mode of operation. Thus, Auto-Negotiation, by reducing bring up and maintenance costs associated with the addition of new systems to an existing network, serves the second of the three aforementioned figures of merit.

Finally, the Auto-Negotiation function recognizes that technology improvements (such as 10BASE-T Full Duplex over 10BASE-T and 100BASE-T over 10BASE-T Full Duplex) must be compatible with earlier/lower end generation equipment. That is, systems with enhanced operational modes generally possess the capability to communicate at operational modes having less performance than their most enhanced mode(s).

FIG. 3 shows the data that is encoded within an advertisement packet 300 sent by a system advertising its capabilities. This data is commonly known as a Link Code Word. Bits A0 through A7 indicate the possible specific operational modes along a link. Thus, for example, a new hub may be compatible with all BASE-T modes, while an older system may only have 10BASE-T capability. Thus the hub will advertise with bits A0 through A4 high while the older system will advertise with only bits A0 and A1 high. Generally, if these two systems were on the same link, they would communicate with one another over 10BASE-T Full Duplex (the highest common operational mode). In this manner, the Auto-Negotiation Function acknowledges that new systems must have downward compatibility with legacy systems and therefore serves the third figure of merit.

FIGS. 4a–4c show the timing associated with the advertisement packets (referred to as Fast Link Pulse or FLP) and the manner and timing in which advertisement packets are encoded. More specifically, FIG. 4a shows the FLP burst to FLP burst timing; FIG. 4b shows pulse-to-pulse timing within an FLP burst and FIG. 4c shows data bit encoding within an FLP burst. FIG. 4d is a table defining the various timing parameters shown in FIGS. 4a and 4b according to IEEE std. 802.3u cl. 28, secs 2.1.1.1-2. As shown, FLPs 401 must be sent every 8 to 24 ms and are approximately 2 ms wide. FLPs 401 consist of alternating clock positions 402 and data positions 403. The first bit in an FLP is always a clock pulse. By gathering the data bits consecutively, the Auto-Negotiation function is able to construct the Link Code Word.

Parallel detection is an additional requirement placed upon the Auto-Negotiation function. It is possible that an adapter card that has Auto-Negotiation capability may be on the same link as a link partner that does not have Auto-Negotiation capability. Under IEEE 802.3, cl. 28 sec 2.3.1, Auto-Negotiation devices are required to identify and communicate with devices that do not possess the Auto-Negotiation function.

FIG. 5 shows the architecture of the Auto-Negotiation function in greater detail. Auto-Negotiation sublayer 501 has three main sections: transmit logic 509, auto-negotiate logic 508 and receive logic 510. Physical Media Attachment (PMA) sublayer 502 is technology specific. That is, there is a unique PMA 502 for 100BASE-TX 503, 10BASE-T 504 and the Normal Link Pulse (NLP) PMA 505 (which is used for both 10BASE-T technologies). Thus an adapter card that supports those four BASE-T technologies will have three PMAs 503–505 (one for both 100BASE-T technologies and the NLP PMA).

One of the unique features of each technology specific PMA is its Link Integrity Test function 512. During the initial phase of link bring up, a device with Auto-Negotiation capability will transmit FLP bursts 506 to its link partner. If the link partner has Auto-Negotiation capability, the link partner will also transmit FLP bursts 513. FLP bursts 506 will be detected by the FLP Decode Logic 507, broken down into a Link Code Word and reported across channel 514 to the auto-negotiate logic 508. As discussed, the auto-negotiate logic 508 will execute the priority resolution function and eventually enable the PMA that corresponds to the settled upon technology. The auto-negotiate logic 508 then updates the Link Partner Ability Register 511 with Link Code Word information so that higher levels of the network can identify the technology employed on the link. At this point, the Auto-Negotiate function is essentially disabled. All received link data is simply passed directly up to higher layers and all transmit information is controlled by the technology specific PMA. The receive logic 510 still looks for FLP packets, however.

If, however, the link partner does not support Auto-Negotiation, that link partner will not transmit an FLP 506. This is because the administrator has to select and fix a single operational mode. Instead, the link partner will transmit a test signal 515, referred to as a Link Integrity Test sequence that is specific to the particular technology of the link partner. The receive unit 510 sends the incoming signal to each PMA 503–505 (simultaneous with its attempts to decode a non-existent FLP, as, at this point, the local device is unaware that the link partner does not have Auto-Negotiation capability). Each PMA 503–505, with its unique Link Integrity Test function 512, will analyze the incoming signal 515 and, ideally, only one PMA will favorably respond with a signal on bus 516 to the incoming integrity test sequence as belonging to that particular technology. This response is communicated to the auto-negotiate logic 508 (e.g., by the 100BASE-TX PMA 503).

At this point, the auto negotiate logic 508, having received a positive response from a Link Integrity Test and a failure by the receive logic 510 to detect an FLP, realizes that the link partner does not have Auto-Negotiation capability. The auto-negotiate logic 508 unit then disables (not shown) the PMAs that did not respond favorably to the incoming signal, does not engage in any priority resolution and updates the Link Partner Ability Register 511. The selected PMA forces the transmission of the Link Integrity Sequence specific to the technology of the PMA. Again, the Auto-Negotiate function is essentially disabled. All received link data is simply passed directly up to the single PMA and all transmit information is controlled by the same PMA. In this manner, the Auto-Negotiate function is able to recognize and allow the communication nodes to communicate with fink partners who do not have the Auto-Negotiate function.

The Auto-Negotiation function also has three other main components: the Remote Fault function, the Next Page function and the Management Function Requirements. Remote Fault is described in IEEE std. 802.3u, cl. 28, secs. 2.3.5. It is simply a bit that is set to logic high within the Link Code Word (see bit RF in LCW 300 of FIG. 3). The bit is enabled and transmitted in a Link Code Word to a remote link partner if the local link partner is experiencing any type of difficulty. This informs the remote link partner that the local device is down.

The Next Page function is described in IEEE std. 802.3u cl. 28 sec. 2.3.4 and is optional. The Next Page function uses the Link Code Word as a signaling tool. For example, if a link partner sends a Link Code Word with the Remote Fault bit high, the link partner may use the Next Page function to send additional information regarding the nature of the fault.

Finally, the Management Function Requirements are described in IEEE std. 802.3u cl. 28 sec. 2.4. Management Function Requirements are essentially a required list of registers that allow a higher level of either hardware, software or both to communicate with and recognize the status of the Auto-Negotiation unit.

As previously discussed, the wiring closet and patch panel approach shown in FIG. 1b helps preserve the investment made in installed copper wire networks. However, some systems (e.g., PCs) have surpassed 200 Mhz clock speeds. Furthermore, systems that operate above the 500 Mhz range are envisioned in the not too distant future. At these speeds, copper's dependability as a physical transport medium is questionable; particularly in applications that require longer distance links (such as backbones that connect multiple networks across an entire campus). Fiber optic media has superior electromagnetic wave characteristics compared to copper (regarding both radiated EMI and signal loss) and, as a result, interest in replacing installed copper with fiber optic cables continues to grow each year.

Thus another LAN evolution is taking place. This evolution is at the transport medium. The evolution is away from copper and toward fiber optic cable. Consistent with this, standardization bodies have started to develop physical layer specifications that employ fiber optic media rather than copper. For example, the IEEE has outlined requirements for a 10 MB/s, 850 nm link (10BASE-FL), and a 100 MB/s, 1300 nm (100BASE-FX) link.

To date, however, no standardized Auto-Negotiation function for use across fiber optic media exists. It is not possible to use the copper-based Auto-Negotiation scheme defined in IEEE std. 802.3u, cl. 28 because of the characteristics of the signals used in FLP transmission.

FIG. 6a illustrates this problem and shows the front end of a receiver configured for use with fiber optic mediums. An incoming light signal 601 is focused upon a photodetector 602 which is reversed biased by DC voltage source 603. The reverse bias maximizes a depletion region in photodetector 602. Carriers, generated in the depletion region by photon absorption as a result of the incident light signal 601, become an input current 613 to a transimpedance amplifier 605. The transimpedance amplifier 605 not only amplifies the signal 613 but also limits the bandwidth of the channel so that high frequency noise is eliminated at the input of the threshold detector 612. AC coupling capacitor 604 is provided to isolate the input of the transimpedance amplifier 605 from the DC voltage 603 (otherwise the output of amplifier 605 will saturate). That is, capacitor 604 is essentially a high pass filter—it blocks DC signals but passes AC signals. However, if the sequence of current pulses 613 that represent logic highs or logic lows are not balanced (that is, the average voltage of the overall signal 613 over time is approximately ½ the logic high voltage level, severe signal distortion may result.

As an example refer to FIGS. 6b and 6c. FIG. 6b shows the Non Return to Zero (NRZ) encoded alternating clock and data pulse sequence that comprise an FLP. FIG. 6c shows the Non Return to Zero Inverse (NRZI) encoded signal of the signal in FIG. 6b (the 100BASE-F standard requires NRZI encoded signals on the fiber optic link media). If the capacitor 604 blocks the DC component of the signal in FIG. 6c, the signal will balance itself at the input of the amplifier 605 and threshold detector 612 such that the area beneath ground 610 is equal to the area above ground 611. The difference between the balanced level and ½ logic high is referred to as baseline wander. The pulses in FIG. 6c will have finite rise and fall times because of the high frequency cutoff of the transimpedance amplifier 605. The combination of finite rise and fall times and baseline wander at the input of threshold detector 612 results in the output of threshold detector 612 having unacceptable random jitter, data dependent jitter and duty cycle distortion. These distortions result in eye pattern closure and inaccurate clock recovery. An identical problem exists concerning the FLP burst to FLP burst timing shown in FIG. 4a. Thus the Auto-Negotiation signaling scheme outlined in IEEE 802.3u cl. 28, is inherently unacceptable for fiber optic applications.

What is desired therefore is an Auto-Negotiation scheme for fiber optic media that: 1) has a balanced or nearly balanced signal across the fiber optic media and 2) utilizes existing standards in areas unaffected by the unbalanced signaling problem.

SUMMARY OF THE INVENTION

The present invention is an architecture, design and scheme for an Auto-Negotiation capability located within a communication node that is attached to a fiber optic medium. In one embodiment, a communication node, having one or more operational modes and coupled to a network through a fiber optic medium, is configured to automatically select an optimum common operational mode between itself and a link partner. The link partner may also be configured to automatically select an optimum common operational mode.

Advertisement packets may be transmitted across the fiber optic medium by the communication node, in order to communicate its operational capabilities to the link partner. These operational capabilities may include 10BASE-FL and 100BASE-FL. Further still, 10 BASE-FL 1 MHz idles are transmitted between advertisement packets. Advertisement packets comprise clock and data pulses.

For one embodiment the communication node may be attached to a network having a bus architecture. Further still, a communication node may be configured to identify an idle signal.

In a further embodiment, the present invention provides a method which includes transmitting from a first communication node, over a fiber optic medium, a signal that indicates one or more operational modes of the first communication node and which allows automatic configuration of a second communication node to one of the operational modes in response thereto. The signal may be an advertising packet. Further, clock pulses, data pulses and transitions may each be transmitted within the advertising packet. Additionally, an idle signal may be transmitted across the fiber optic medium. In yet a further embodiment, the present invention provides a process of determining an optimum common operational mode of two communication nodes coupled by a fiber optic link, for example, by exercising a priority resolution function.

BRIEF DESCRIPTION OF THE DRAWINGS

The present invention is illustrated by way of example and not limitation in the figures of the accompanying drawings in which:

FIG. 3 is an illustration of a conventional Link Code Word.

FIG. 4d is a table showing timing requirements for conventional Auto-Negotiation schemes.

FIGS. 8a, 8b and 8c are schematic illustrations of Fiber Auto-Negotiation timing signals according to an embodiment of the present invention.

FIG. 8d is a table showing timing parameters for Fiber Auto-Negotiation according to an embodiment of the present invention.

FIG. 8e is a Link Code Word formatted according to an embodiment of the present invention.

FIG. 10 illustrates features of one possible architecture for Fiber Auto-Negotiation according to an embodiment of the present invention.

DETAILED DESCRIPTION

Described herein is a novel Auto -Negotiation scheme for fiber optic link communication nodes. In the following description numerous specific details are set forth, such as particular system architectures, functional blocks and logical designs in order to provide a thorough understanding of the present invention. Upon review and understanding of this specification, however, one skilled in the art may appreciate that the present invention may be practiced without these specific details. For instance, one embodiment of the present invention is directed to fiber optic link partners in an Ethernet hub-based LAN. However, the subject matter of the invention is equally applicable to other fiber optic network configurations (such as rings) and to other point-to-point data link based systems (such as ATM). Furthermore, other embodiments are applicable to communication nodes in general and are not limited to systems attached to LAN hubs. In other instances well known architectures, functional blocks and logical designs have not been set forth in particular detail in order to not unnecessarily obscure the present invention.

In various embodiments, the present invention provides an architecture, design and/or scheme for an Auto-Negotiation capability located within a communication node that may be attached to a fiber optic medium. For example, a communication node, having one or more operational modes and coupled to a network through a fiber optic medium, may be configured to automatically select an optimum common operational mode between itself and a link partner. The link partner may also be configured to automatically select an optimum common operational mode. For example, the communication node, and/or its link partner, may transmit advertisement packets across the fiber optic medium in order communicate its operational capabilities. These operational capabilities may include 10BASE-FL and 100BASE-FL. Further still, 10BASE-FL 1 MHz idles are transmitted between advertisement packets. Advertisement packets comprise clock and data pulses. The communication node may be attached to a network having a bus architecture and may be further configured to identify an idle signal.

In further embodiments the present invention may provide for transmitting, from a first communication node, over a fiber optic medium, a signal that indicates one or more operational modes of the communication node and which allows for automatic configuration of a second node to one of the operational modes in response thereto. The signal may be an advertising packet which may include clock pulses, data pulses and transitions. Additionally, an idle signal may be transmitted on the fiber optic medium.

In another embodiment, the present invention provides a process for determining an optimum common operational mode of two communication nodes coupled by a fiber optic link, for example, by exercising a priority resolution function.

Figure 7:
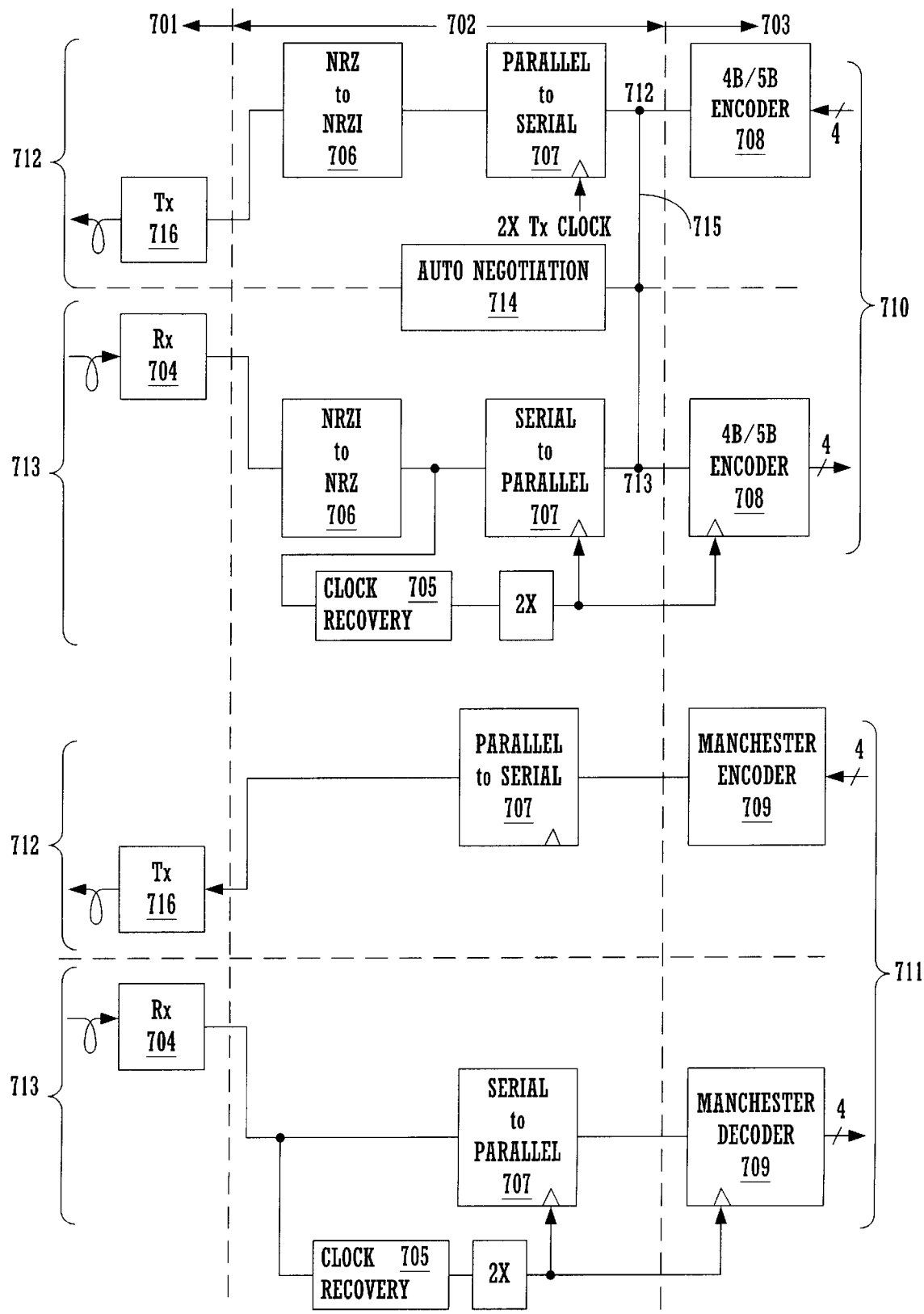
FIG. 7 is a schematic illustration of an embodiment of the present invention.

FIG. 7 shows the lower physical layers of a fiber optic link employing fiber optic media. In particular, the relevant sections of the Media Dependent Interface layer (MDI) 701, the Physical Media Attachment layer (PMA) 702, and the Physical Coding Sublayer (PCS) 703 are shown. According to one embodiment of the present invention, PCS and PMA layers for 100BASE-FX, 100BASE-FL and 10BASE-FL are provided. 100BASE-FX and 100BASE-FL have identical PMA and PCS layers. However, 100BASE-FX employs 1300 nm wavelength light and 100BASE-TX employs 850 nm wavelength light. Hereinafter, such systems may be jointly referred to as 100BASE-F.

Currently, 100 BASE-FX is the only 1300 nm standard for Ethernet. Thus 1300 nm Ethernet links have no need for Auto-Negotiation. That is, there is only one operational mode at that wavelength. Thus, one embodiment of the present invention does not implement auto-negotiation for 100BASE-FX. However, this functional limit is a result of the current position of the IEEE standards committee and is not due to an inherent limitation of the present invention. If, at some future time, another 1300 nm operational mode is offered, fiber Auto-Negotiation may easily be implemented for the 1300 nm technology according to the methods and apparatus described herein.

FIG. 7 shows two separate channels, 710 and 711, one for 100BASE-F (710) and one for 10BASE-FL (711). The PMA layer 702 and PCS layer 703 are different for these two channels. PCS layer 703 employs Manchester encoding for 10BASE-FL while 4B/5B encoding is used for 100BASE-F. Further, the PMA layers 702 for each of these technologies each employ different idle signal generation circuitry (not shown).

Figure 6A:
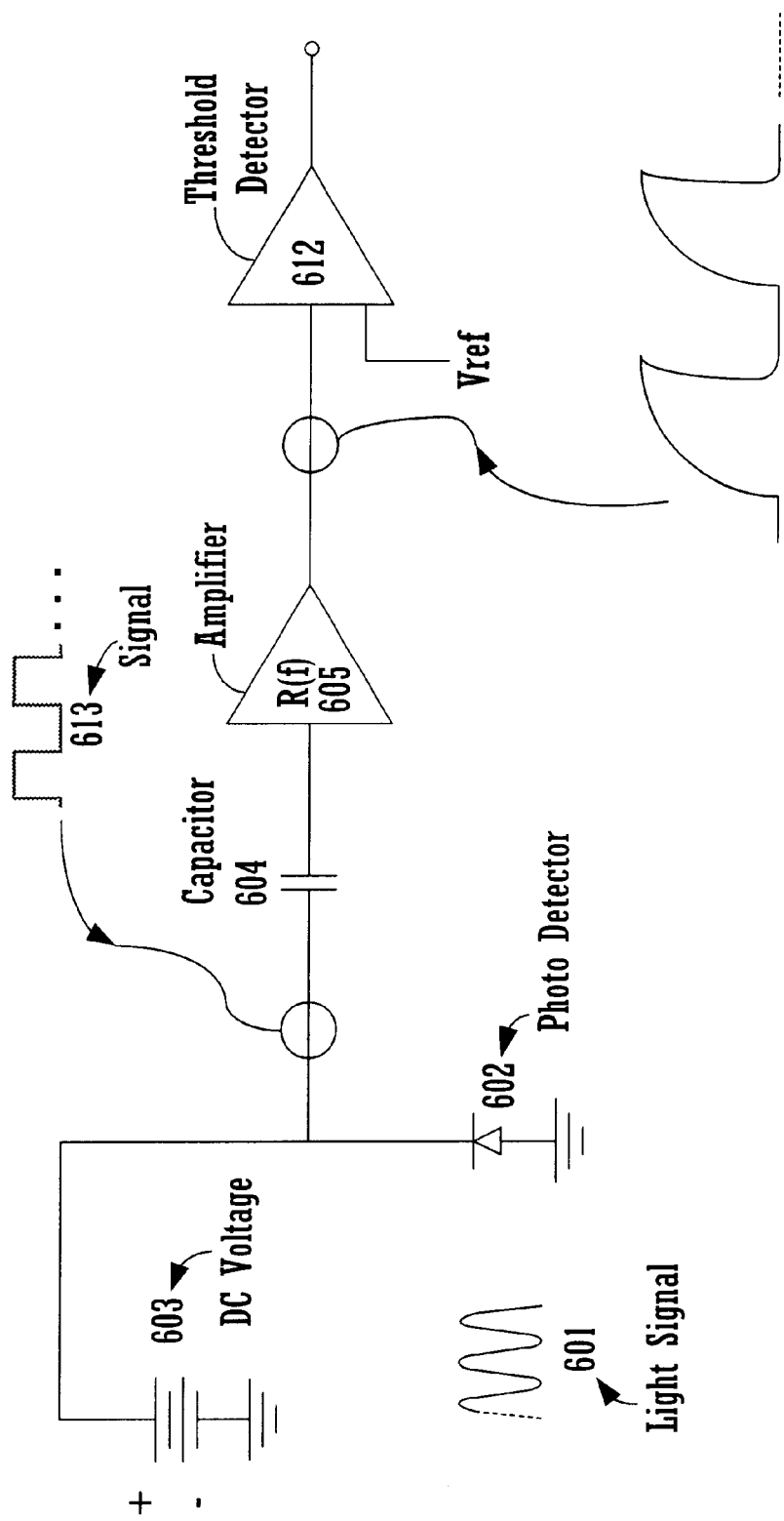
FIG. 6a is an illustration of a front end of a fiber optic receiver.
Figure 6B:
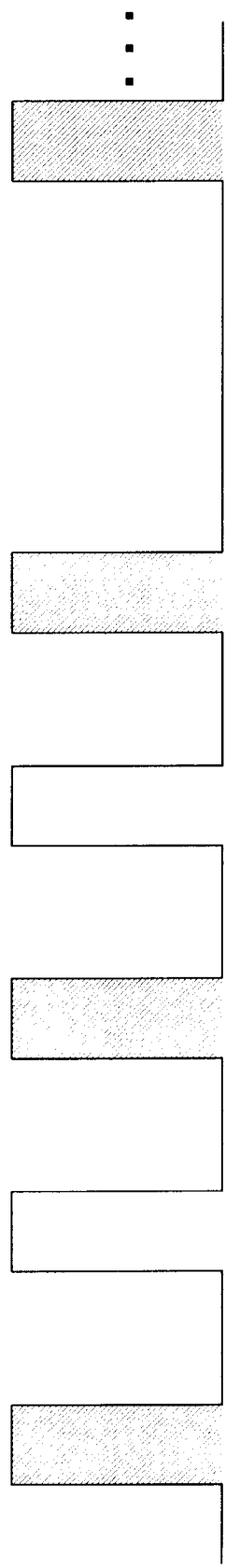
FIGS. 6b an 6c illustrate typical signals which may be present in a communication system employing fiber optic media.
Figure 6C:
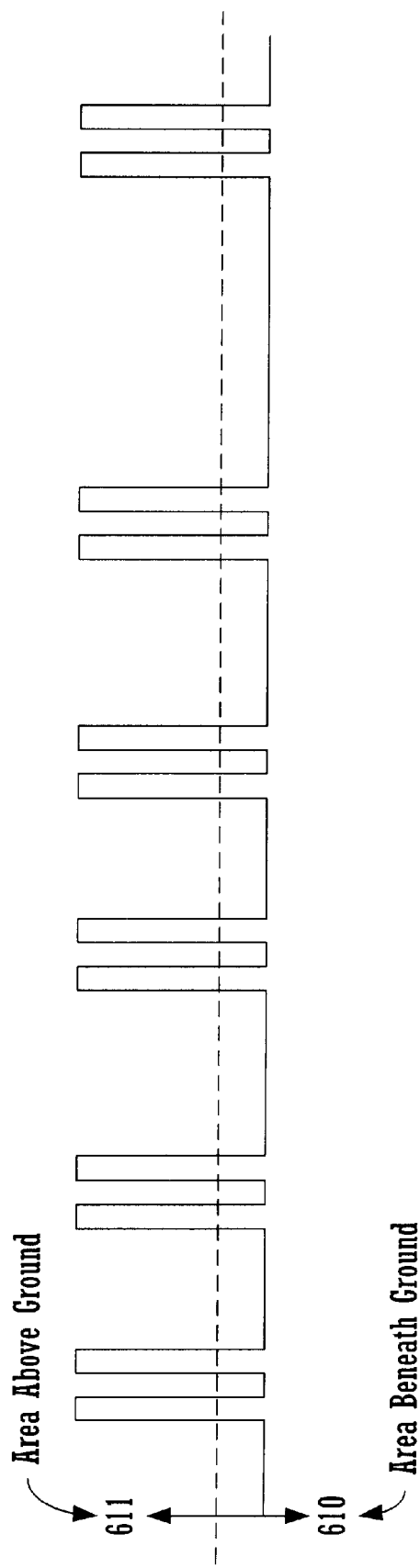

FIG. 7 also shows the receive front end blocks 704 (which may be similar to those depicted in FIG. 6a), the transmit front end blocks 716, the clock recovery blocks 705, the NRZI/NRZ blocks 706, the parallel/serial blocks 707, the 4B/5B blocks 708 and the Manchester blocks 709. A transmit data path 712 and a receive data path 713 is shown for each channel 710, 711.

Using the 100BASE-F portion of FIG. 7 as the basis for an example, data is transmitted as follows. Four bit wide data nibbles are received from higher data application layers at the input of the 4B/5B block 708 which encodes the data according to the 4B/5B encoding scheme. The output of the 4B/5B encoding is a 5 bit wide data unit (referred to as a fibble) which is then input to the parallel/serial block 707 across bus 715. Parallel/serial block 707 converts the five bit fibble to a serial data stream. All of the data processing up to this point is performed according to the NRZ data format. After the parallel-to-serial conversion, the data is encoded from NRZ to NRZI by the NRZI/NRZ block 706. The output data stream is then directed to the transmit front end block 716 which converts the electrical data stream to an optical signal that is launched onto the fiber optic medium.

Data is received in a manner opposite to its transmission. That is, an NRZI encoded optical data stream is received and converted to an electrical data stream by the receive front end block 704. The NRZI encoded electrical data stream is decoded to NRZ format by the NRZI/NRZ block 706. (Note that for clarity two NRZ/NRZI blocks 706 have been illustrated, however, it should be appreciated that these units may comprise a single, physical encoder/decoder. Similarly, the parallel/serial blocks 707 and the 4B/5B encoders 708 may be single units.) The output of the NRZI/NRZ block 706 is directed to the clock recovery block 705 and the parallel/serial block 707. The parallel/serial block 707 converts the NRZ encoded data stream back to a five bit fibble which is ultimately passed to 4B/5B block 708 which decodes the data from 4B/5B encoding for the higher data layers.

The auto-negotiation block 714 is also shown in FIG. 7. For convenience, the auto-negotiation block 714 is drawn as though it is a component of the PMA layer 702. However, the auto-negotiation block 714 is considered, similar to the BASE-T technologies, a separate layer that resides between the MDI 701 and PMA 702 layers. The auto-negotiation block 714 interfaces with the data paths 712 and 713 in the region 715 between the serial/parallel blocks 707 and the 4B/5B encoder 708. The function of the auto-negotiation block 714 is similar to the Auto-Negotiation function specified in IEEE std. 803.2u cl.28. That is, the auto-negotiation block 714 is responsible for the transmission of FLPs at link start up.

Figure 1A:
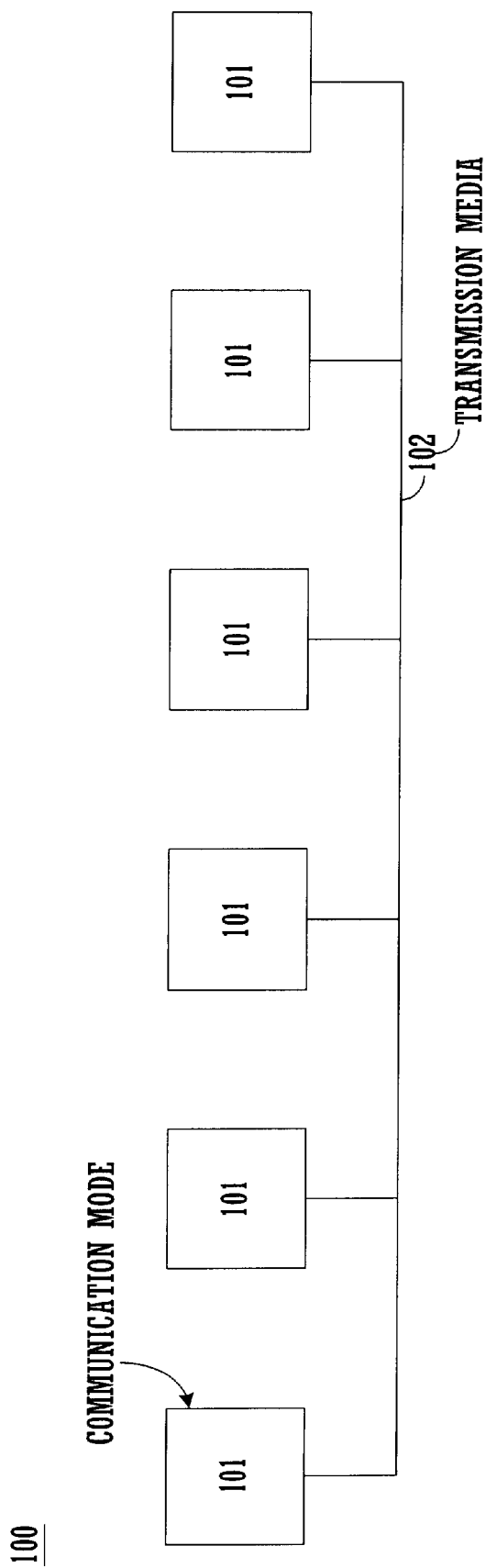
FIGS. 1a and 1b illustrate conventional shared media networks.
Figure 1B:
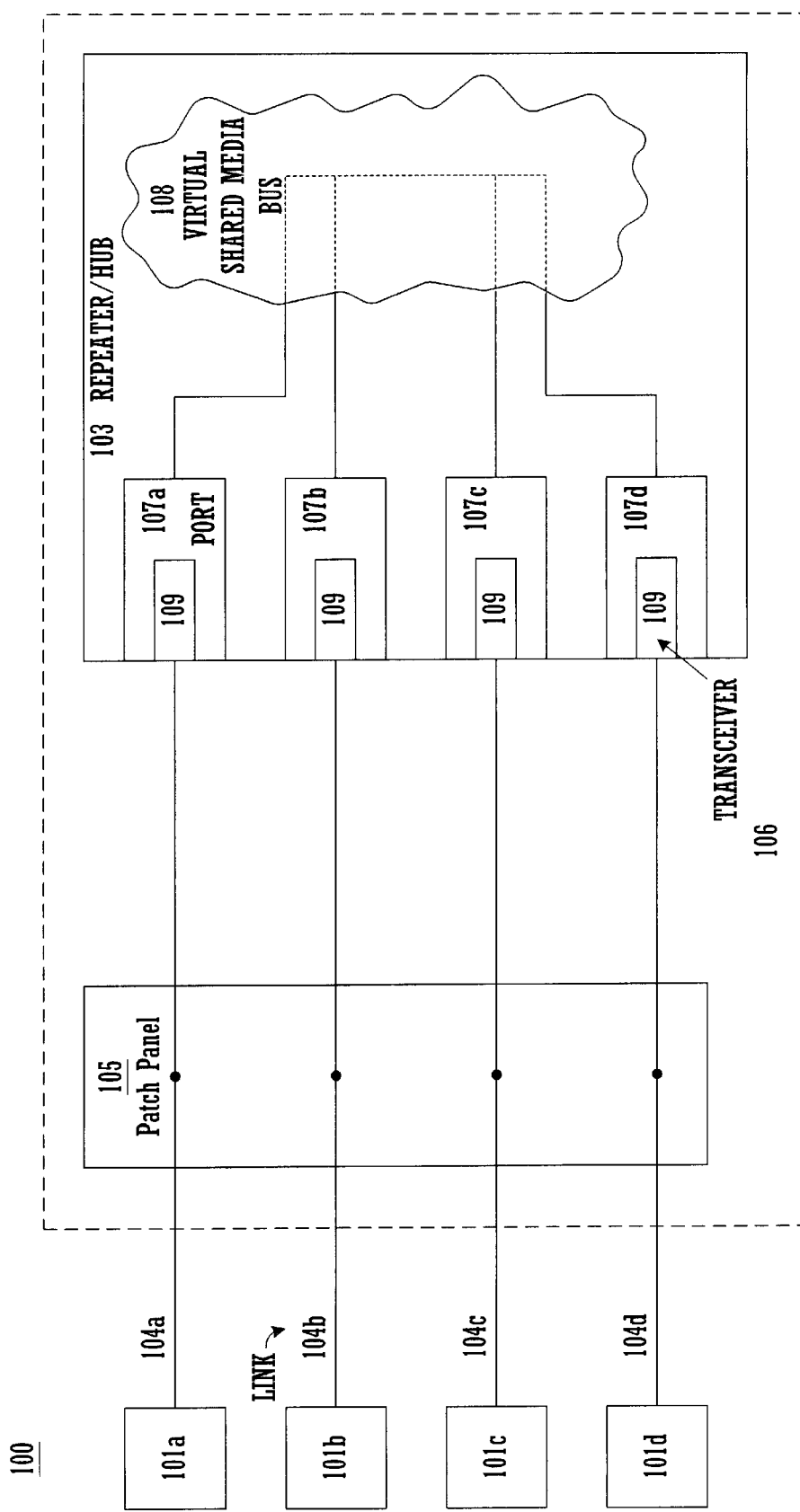
Figure 2:
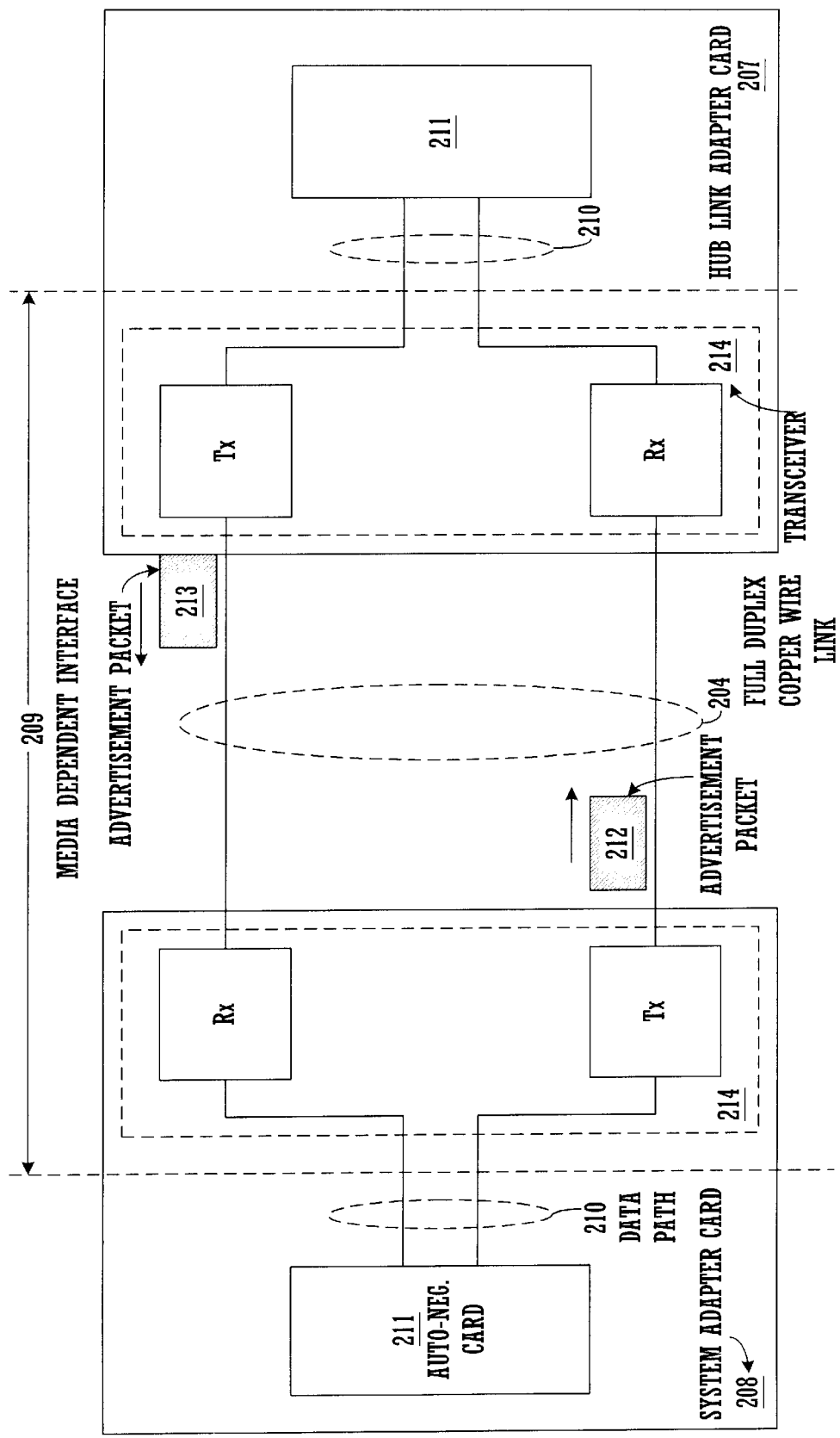
FIG. 2 illustrates conventional adapter cards of a pair of data link partners coupled across a conventional link.
Figure 4A:
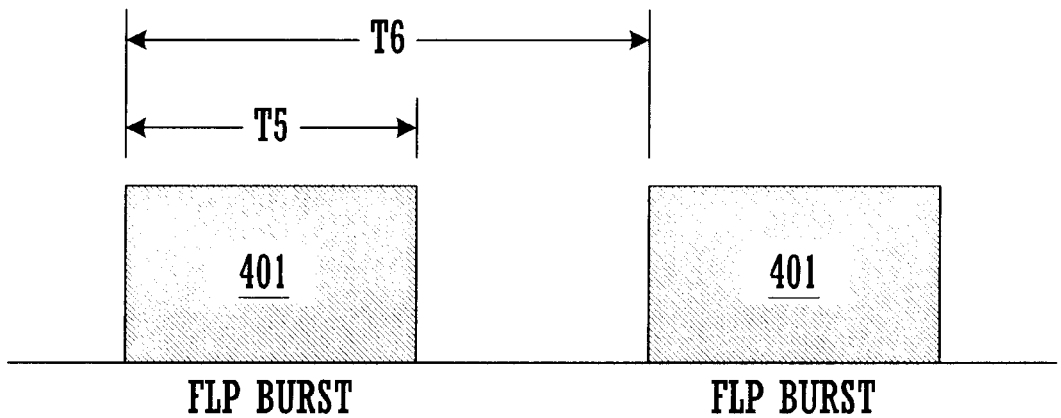
FIGS. 4a, 4b, 4c illustrate conventional Auto-Negotiation timing requirements.
Figure 8A:
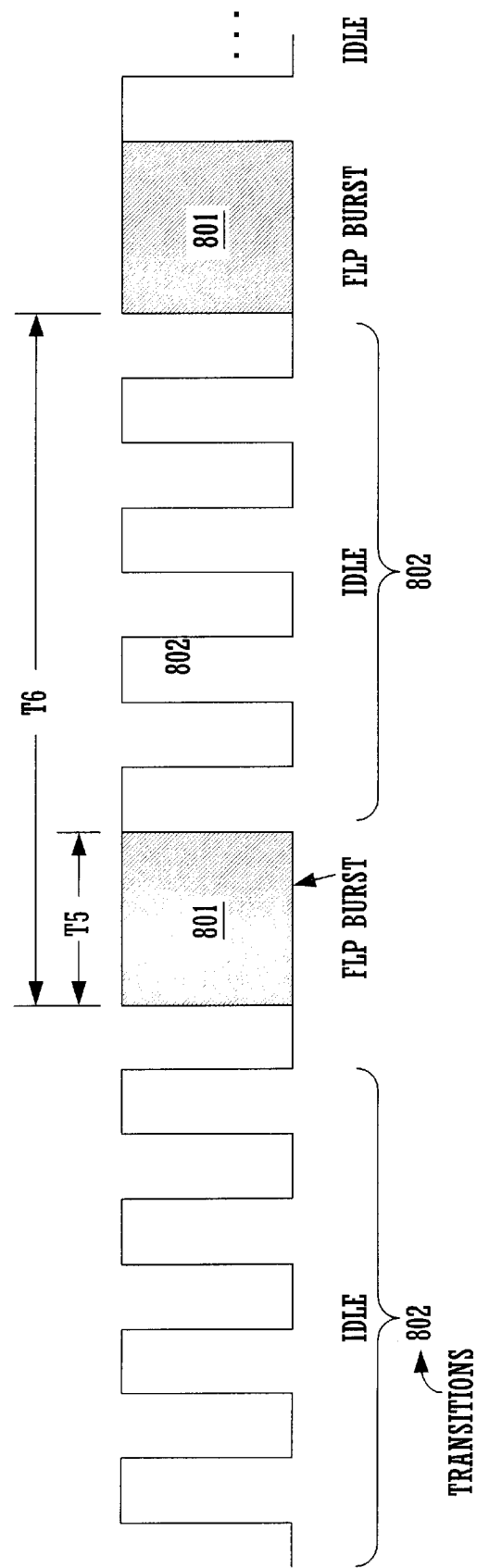

The FLP burst 801 shown in FIG. 8a are NRZI encoded signals and appear in FIG. 8a as they are seen at the MDI. However, unlike the FLPs of FIG. 4 which conform to the IEEE 802.3 standard, the auto-negotiation block 714 inserts transitions 802 (e.g., pulses) between the FLPs 801. For example, 1 MHz 10Base-FL IDLE signals are inserted in-between adjacent FLP bursts. The presence of transitions 802 balances the signal that is transmitted over the fiber optic medium. Thus, the aforementioned duty cycle distortion effects at a remote link partner's receiver are avoided.

Figure 4B:
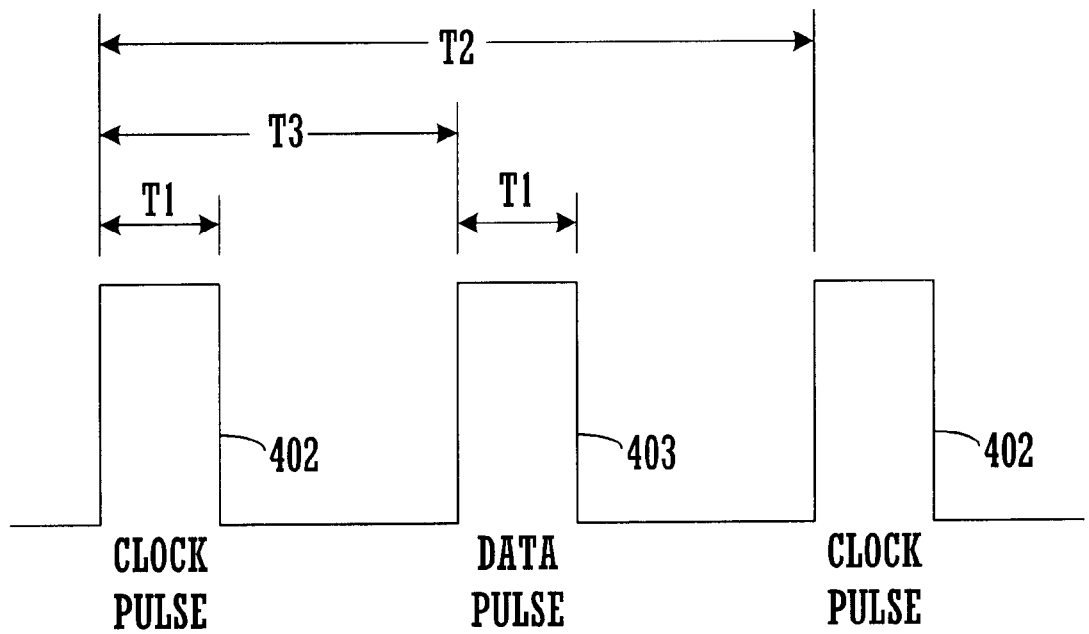
Figure 4C:
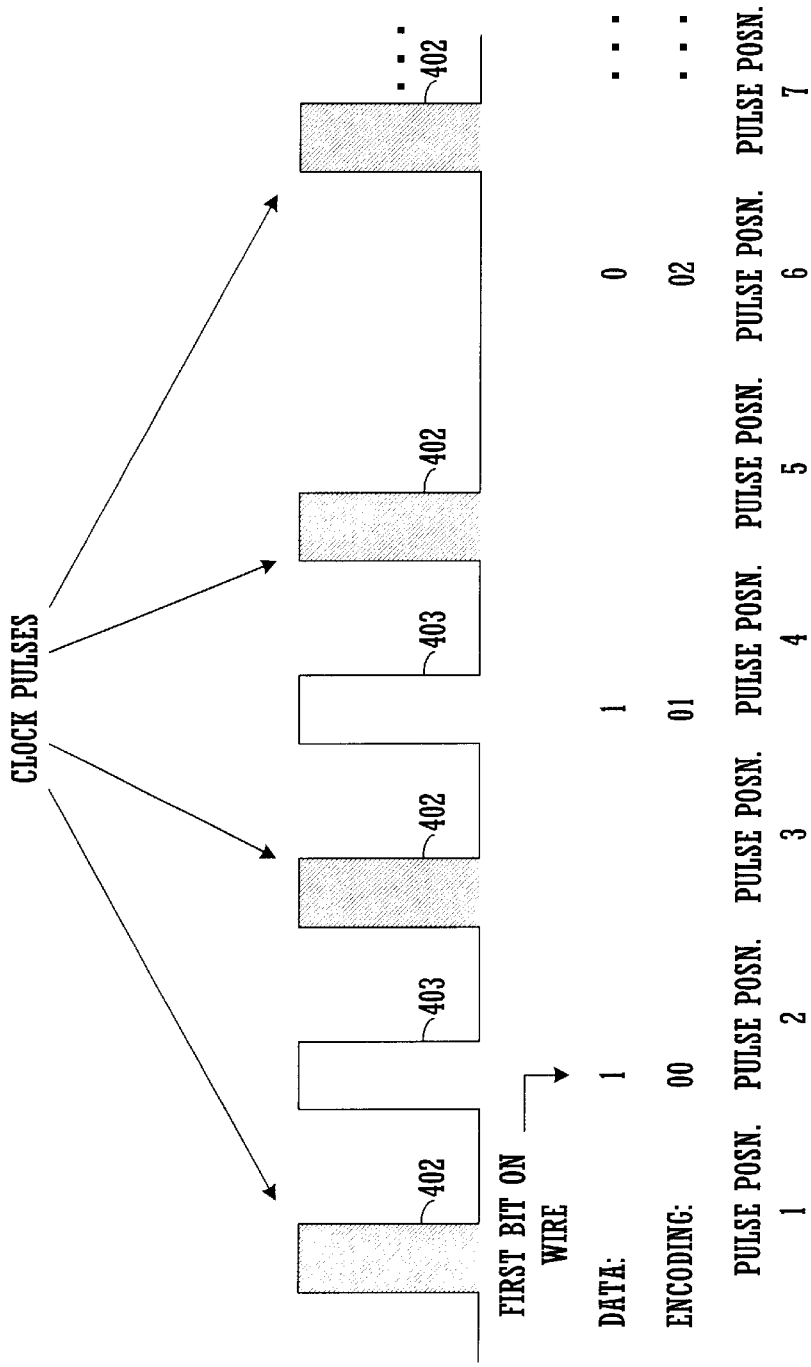
Figure 5:
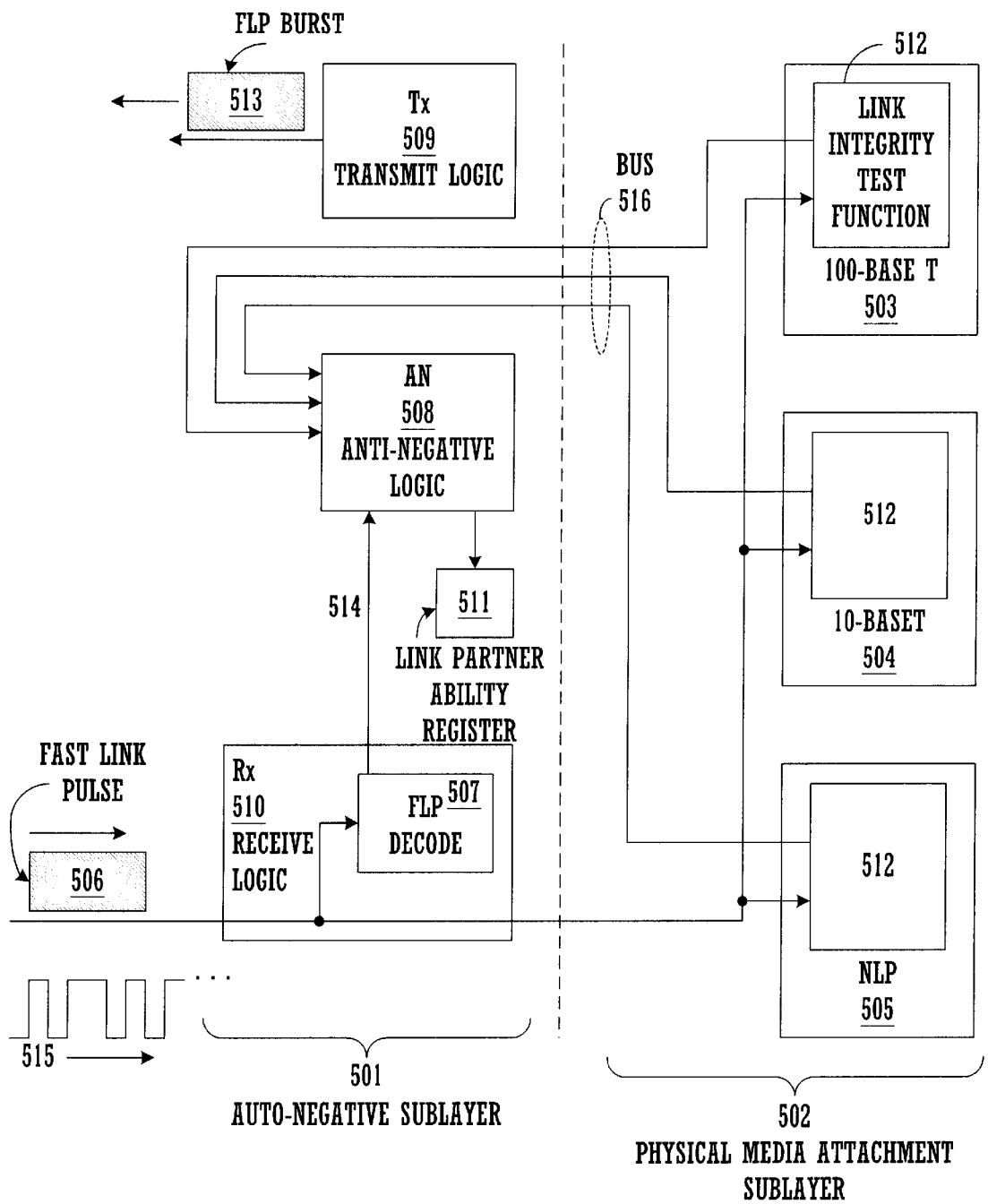
FIG. 5 is an illustration of some conventional architecture requirements of communication units employing an Auto-Negotiation layer.

FIG. 8b, similar to FIGS. 4b–c, shows the sequence and timing of pulses within an FLP 801. The data pulses (e.g., 0s and 1s) within an FLP may be collected in order to construct a Link Code Word. 1 MHz 10BASE-FL IDLE signals 803 are inserted between the clock pulses 804 and data pulses 805.

FIG. 8d shows a table of timing requirements for the various parameters illustrated in FIGS. 8a–8c according to one embodiment of the present invention. These requirements are identical to the requirements listed in Table 1 with the exception of the clock/data pulse width. IEEE std. 802.3 for 10BASE-FL calls for a low light on the fiber for 4 bit times to 21 bit times (0.4 $\mu$s 2.1 $\mu$s) at the end of every packet. For this reason, the fiber link pulse width is chosen as 3 μs so as not to be confused with the 2.1 μs of low light at the end of packet. Note that FIG. 8b shows only one idle signal in between clock 804 and data 805 pulses. This is for the purpose of illustration and in an actual implementation many idle signals may be present. For example, the table of FIG. 8d indicates that T3, the clock pulse-to-data pulse time may be a minimum of 55.5 μs. A 1 MHz signal has a period of 1 μs. Thus, for such an embodiment at least 55 idle cycles between every clock pulse 804 and data pulse 805 pair for a 10BASE-FL link. Similar conveniences have been used for the illustration in FIG. 8a.

In FIG. 8(c) reference numeral 809 represents the NRZ FLP burst which could be transmitted, after NRZI encoding, as shown in FIG. 8(b) 807 or 808. This is because the NRZ-NRZI encoding is based on transitions and the initial state of the first pulse of he FLP burst could be logic 1 or logic 0. The signals 807 and 808 are logically equivalent and will not make any difference to the NRZI-NRZ decoder of the link partner.

FIG. 8e shows a Link Code Word used for fiber Auto-Negotiation according to an embodiment of the present invention. The structure is similar to that used for twisted-pair based Auto-Negotiation. However, this time fiber technologies are advertised in bits A0–A7. It is important to realize that although one embodiment of the present invention only advertises link speed or link capacity within the Link Code Word, many other operational parameters of a communication node may also be included within the Link Code Word. Thus fiber based Auto-Negotiation is not limited to merely the configuration of a data link's highest common performance but also includes optimum common operational modes where an "operational mode" encompasses a number of different communication node parameters. Furthermore, Link Code Words having different formats than the one shown in FIG. 8e may also be used under different embodiments of the present invention. That is, the specific Link Code Word of FIG. 8e is only one type of advertisement packet. Many various forms of advertisement packets that differ from the Link Code Word of FIG. 8e are possible under the present invention.

According to the present invention, similar to IEEE 802.3u, cl.28, two link partners may execute identical priority resolution functions. It is important to note that under alternate embodiments of the invention, other processes (besides a priority based algorithm) for determining an optimum operational mode exist.

In light of the discussion associated with FIG. 8, auto-negotiation block 714 may include at least some or all of the following functionalities: 1) insertion of 1 MHz 10BASE-FL idle signals 802 in accordance with the time periods specified in table 2 of FIG. 8d; 2) insertion of 1 MHz 10BASE-FL idle signals 803, between clock pulses 804 and data pulses 805, in accordance with the time periods specified in table 2 of FIG. 8d; 3) insertion of an unbroken idle sequence 806 where a data zero is located within an FLP packet; and 4) transmission of 2.5 μs–3.5 μs data pulse 805 or clock pulses 804. During reception, auto-negotiation block 714 should be configured to correctly reproduce a Link Code Word from signals such as those depicted in FIGS. 8a–b, including instances where the received NRZ signal is the inversion of the signal transmitted by the link partner. These specific requirements are not necessary in order to fully appreciate or implement the present invention. That is, the idea of ensuring that periodic capability broadcasts are composed of balanced signals is applicable in a number of different schemes and sequences. For example, the serial bit stream could be further encoded with a balanced encoding algorithm (such as 8B/10B) prior to the NRZI encoding.

Similar to EEEE 802.3u cl. 28, fiber Auto-Negotiation according to the present invention provides for parallel detection. As discussed previously, parallel detection is the recognition, by a device having Auto-Negotiation capability, of link partner which does not have Auto-Negotiation capability. However, the implementation of parallel detection across a fiber optic medium is different than its implementation for twisted-pair (copper wire) based links. First, only two fiber based PMAs (one for 100BASE-FL and one for 10BASE-FL) are required. (100BASE-FX currently cannot implement parallel detection because that technology does not employ fiber Auto-Negotiation.) Second, the various fiber-based technologies (10BASE-FL, 100BASE-FL and 100BASE-FX) do not support Link Pulse Test Sequences (similar to twisted-pair based devices). Thus, for fiber-based technologies, it is not possible to recognize a link partner by its Link Pulse Test sequence. Each of the technologies do, however, have a unique idle signal. 10BASE-FL uses a 1 MHz idle signal while 100BASE-F uses a 62.5 MHz idle signal. Thus parallel detection is possible via recognition of link partner idle signals.

FIG. 10 shows the architecture of the auto-negotiation block 714 in greater detail. Auto-Negotiation sublayer 1001 has three main logic sections: transmit logic 1009, auto negotiate logic 1008 and receive logic 1010. The PMA sublayer is shown as 1002. During the initial phase of link bring up, a device with Auto-Negotiation capability will transmit FLP bursts 1006 to its link partner. If the link partner has Auto-Negotiation capability, the link partner will also transmit FLP bursts 1013. FLP bursts 1006 will be detected by the FLP Decode Logic 1007 and the Link Code Word will be extracted and reported by a signal 1014 to the auto-negotiate logic 1008. The auto-negotiate logic 1008 will execute the priority resolution function and eventually enable the PMA that corresponds to the settled upon technology. The auto-negotiate logic 1008 then updates the Link Partner Ability Register 1011 so that higher levels of the network can identify the technology employed on the link. At this point, the auto-negotiate block 714 is essentially disabled. All received link data is simply passed directly up to higher layers and all transmit information is controlled by the PMA. The receive logic 1010 still looks for FLP packets, however.

If however, the link partner does not support Auto-Negotiation, that link partner will not transmit an FLP 1006. Instead, the link partner will transmit its technology specific idle signal 1015. The receive unit 1010 sends the incoming signal to the parallel detection logic which identifies the link partner PMA as 10 BASE-FL or 100BASE-FL. This information is conveyed to the auto-negotiation logic.

At this point, the auto negotiate logic 1008, having received a positive response from a idle signal detect function 1012 and a failure by the receive unit 1010 to detect an FLP, realizes that the link partner does not have Auto-Negotiation capability. The auto-negotiate logic 1008 then disables (not shown) the PMAs that did not respond favorably to the incoming signal, configures the link in half duplex mode and updates the Link Partner Ability Register 1011. The selected PMA (e.g., 1003) forces the transmission of the PMA's technology specific idle signal. Again, the auto-negotiate block 714 is essentially disabled. All received link data is simply passed directly up to the single PMA and all transmit information is controlled by the same PMA. In this manner, the Auto-Negotiate function is able to recognize and allow a communication node or hub to communicate with link partners which do not have an Auto-Negotiate capability.

The Auto-Negotiation function of the present invention also has three other main components: the Remote Fault function, the Next Page function and the Management Function Requirements. In one embodiment, Remote Fault, Next Page and the Management Function Requirements are identical to existing IEEE std. 802.3u, cl. 28, secs. 2.3.5, 2.3.4 and 2.4 requirements. One of the motivations of the present invention is the utilization of existing standards where possible. Utilizing these functions in unaltered form is consistent with this goal.

Figure 9:
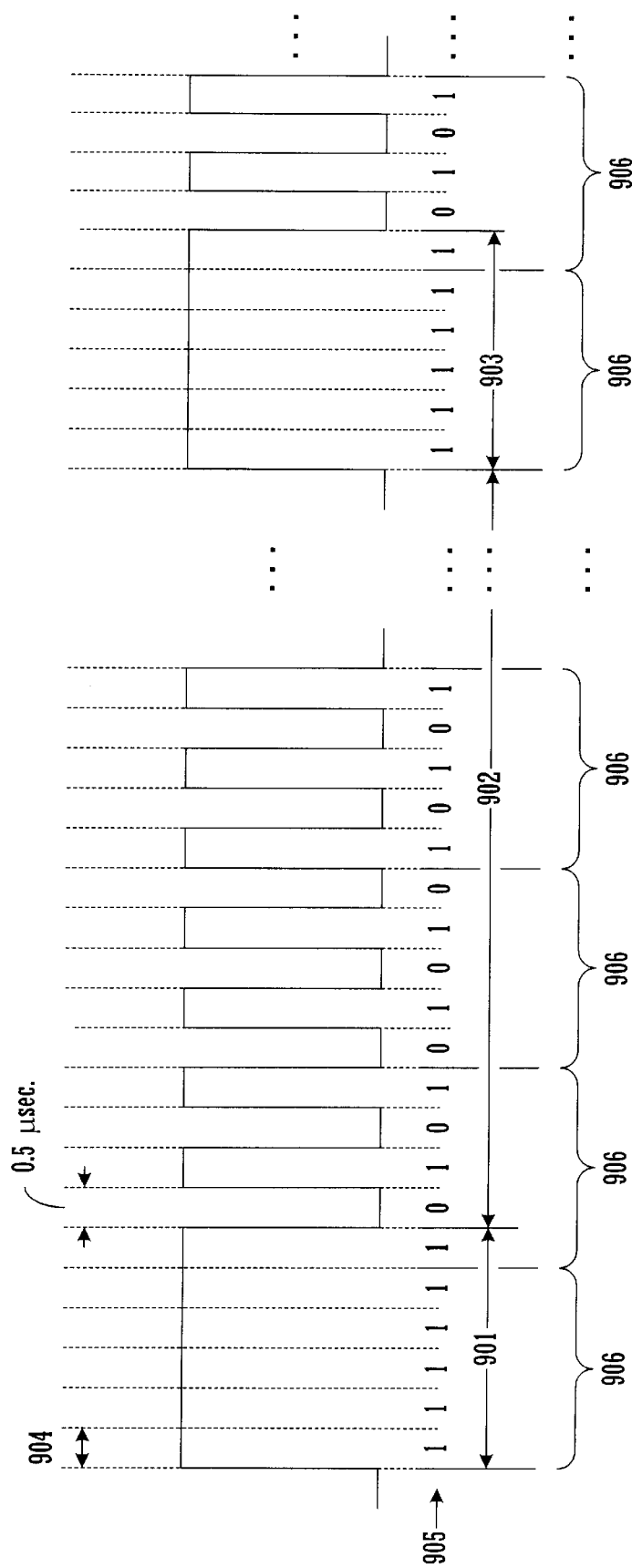
FIG. 9 is a schematic illustration of the output of an auto-negotiation block according to an embodiment of the present invention.

As mentioned there is currently no need for fiber auto negotiation in 1300 nm links (although such capability may be implemented in accordance with the present invention and is certainly contemplated thereby). However, a 1300 nm link still has a need for features such as the Remote Fault feature. For one embodiment of the present invention, the 1300 nm 100BASE-FX uses an in-band signaling feature called Far End Fault. The Far End Fault indication consists of 84 logic ones (1s) followed by a logic zero (0), with this pattern repeated at least three times. Again, similar to the discussion regarding FIG. 9, the Far End Fault signal is preferably constructed in five-bit units. Far End Fault generation and detection logic may be located in the auto-negotiation block 714.

Thus, a novel auto-negotiation architecture, design and scheme for fiber optic link partners has been described. Although discussed with reference to certain specifically illustrated embodiments, the present invention is applicable to a variety of systems and architectures employing fiber optic media. Accordingly, the present invention should only be measured in terms of the claims which follow.

What is claimed is:

1. A communication apparatus comprising a pair of communication nodes each having one or more operational modes and being coupled together through a fiber optic medium, at least one of said nodes operable to transmit a signal comprising advertisement packets and transitions across said fiber optic medium and to automatically select a common operational mode of said nodes wherein said transitions are operable to prevent baseline wander of said signal at a receiving node.

2. The communication apparatus of claim 1 wherein each of said communication nodes are operable to automatically select an optimum common operational mode.

3. The communication apparatus of claim 1 wherein said advertisement packets comprise clock pulses, data pulses and transitions.

4. The communication apparatus of claim 1 wherein said operational modes comprise 10BASE-FL and 100BASE-FL.

5. The communication apparatus of claim 1 wherein said nodes are coupled to a network having a bus architecture.

6. The communication apparatus of claim 1 wherein said one node is further operable to identify an idle signal received on said fiber optic medium as being received from a node without auto-negotiation.

7. The communication apparatus of claim 1 wherein said transitions are between said advertisement packets.

8. A communication apparatus comprising:
   a) a first system coupled to a fiber optic medium; and
   b) a second system coupled to said fiber optic medium, said second system having at least one operational mode and operable to transmit advertisement packets across said fiber optic medium, to transmit transitions between said advertisement packets, and to automatically select a common operational mode with said first system, wherein said transitions are operable to prevent baseline wander of a signal received at said first system, said signal comprising said advertisement packets and said transitions.

9. The communication apparatus of claim 8 wherein said advertisement packets are approximately 2 ms wide and are transmitted approximately every 8 to 24 ms.

10. The communication apparatus of claim 8 wherein said transitions being an idle signal.

11. The communication apparatus of claim 8 wherein said second system is further operable to identify an idle signal received on said fiber optic media as being received from a node without auto-negotiation.

12. The communication apparatus of claim 8 wherein said second system is further operable to automatically select an optimum common operational mode with said second system.

13. A method, comprising:
   transmitting from a first communication node over a fiber optic medium a signal indicating one or more operational modes of said first communication node, wherein said signal comprises both a plurality of advertising packets and a plurality of transitions; and
   automatically configuring a second node to a first of said one or more operational modes in response to said signal, wherein said transitions are operable to prevent baseline wander of said signal at said second node.

14. The method of claim 13 wherein said step of transmitting comprises transmitting an idle signal.

15. The method of claim 13 wherein said step of automatically configuring comprises exercising a priority resolution function at said second node to select an optimum one of said operational modes.

16. The method of claim 13, wherein said plurality of transitions are transmitted between said plurality of advertising packets.

* * * * *